(12) United States Patent
Narita et al.

(10) Patent No.: US 10,186,284 B2
(45) Date of Patent: Jan. 22, 2019

(54) MAGNETIC HEAD AND MAGNETIC RECORDING AND REPRODUCING DEVICE

(71) Applicant: Kabushiki Kaisha Toshiba, Tokyo (JP)

(72) Inventors: Naoyuki Narita, Kanagawa (JP); Hitoshi Iwasaki, Tokyo (JP); Mariko Shimizu, Tokyo (JP); Katsuhiko Koui, Kanagawa (JP); Kenichiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/703,089

(22) Filed: Sep. 13, 2017

(65) Prior Publication Data

US 2018/0261241 A1 Sep. 13, 2018

(30) Foreign Application Priority Data

Mar. 8, 2017 (JP) .................................. 2017-043826

(51) Int. Cl.
*G11B 5/31* (2006.01)
*G11B 5/66* (2006.01)
(Continued)

(52) U.S. Cl.
CPC .............. *G11B 5/315* (2013.01); *G11B 5/187* (2013.01); *G11B 5/312* (2013.01); *G11B 5/3116* (2013.01);
(Continued)

(58) Field of Classification Search
None
See application file for complete search history.

(56) References Cited

U.S. PATENT DOCUMENTS 8,687,321 B2 * 4/2014 Yamada ................... G11B 5/02
360/125.3
8,824,104 B1 9/2014 Koui et al.
(Continued)

FOREIGN PATENT DOCUMENTS

JP 2010-003354 1/2010
JP 2012014783 A * 1/2012
(Continued)

OTHER PUBLICATIONS

English-machine translation entitled "Search Result," with a translated date of Apr. 18, 2018, of JP-2012-014783A to Koi/Otake dated Jan. 19, 2012.*

*Primary Examiner* — William J Klimowicz
(74) *Attorney, Agent, or Firm* — Finnegan, Henderson, Farabow, Garrett & Dunner, L.L.P.

(57) ABSTRACT

According to one embodiment, a magnetic head includes a magnetic pole, and a first shield, and a stacked body provided between the magnetic pole and the first shield. The stacked body includes a first layer, a second layer and a third layer. The first layer includes at least one first element selected from the group consisting of Fe, Co, and Ni. The second layer is provided between the magnetic pole and the first layer, and includes at least one second element selected from the group consisting of Cr, V, Mn, Ti, and Sc. The third layer is provided between the first layer and the first shield, and includes at least one third element selected from the group consisting of Cr, V, Mn, Ti, and Sc.

19 Claims, 7 Drawing Sheets

(51) Int. Cl.
*G11B 5/48* (2006.01)
*G11B 5/187* (2006.01)

(52) U.S. Cl.
CPC .......... *G11B 5/4813* (2013.01); *G11B 5/4826* (2013.01); *G11B 5/66* (2013.01)

(56) References Cited

U.S. PATENT DOCUMENTS

| | | |
|---|---|---|
| 9,805,746 B1 * | 10/2017 | Okamura .............. G11B 5/3153 |
| 2009/0316303 A1 | 12/2009 | Yamada et al. |
| 2012/0154952 A1 | 6/2012 | Yamada et al. |
| 2014/0063648 A1 * | 3/2014 | Shiroishi .............. G11B 5/3909 360/75 |
| 2014/0146420 A1 | 5/2014 | Shimizu et al. |
| 2018/0075868 A1 * | 3/2018 | Koui .................... G11B 5/1278 |

FOREIGN PATENT DOCUMENTS

| | | |
|---|---|---|
| JP | 2014-130672 | 7/2014 |
| JP | 2015-011745 | 1/2015 |
| JP | 2018-45730 A | 3/2018 |
| WO | WO2011-027396 | 3/2011 |

\* cited by examiner

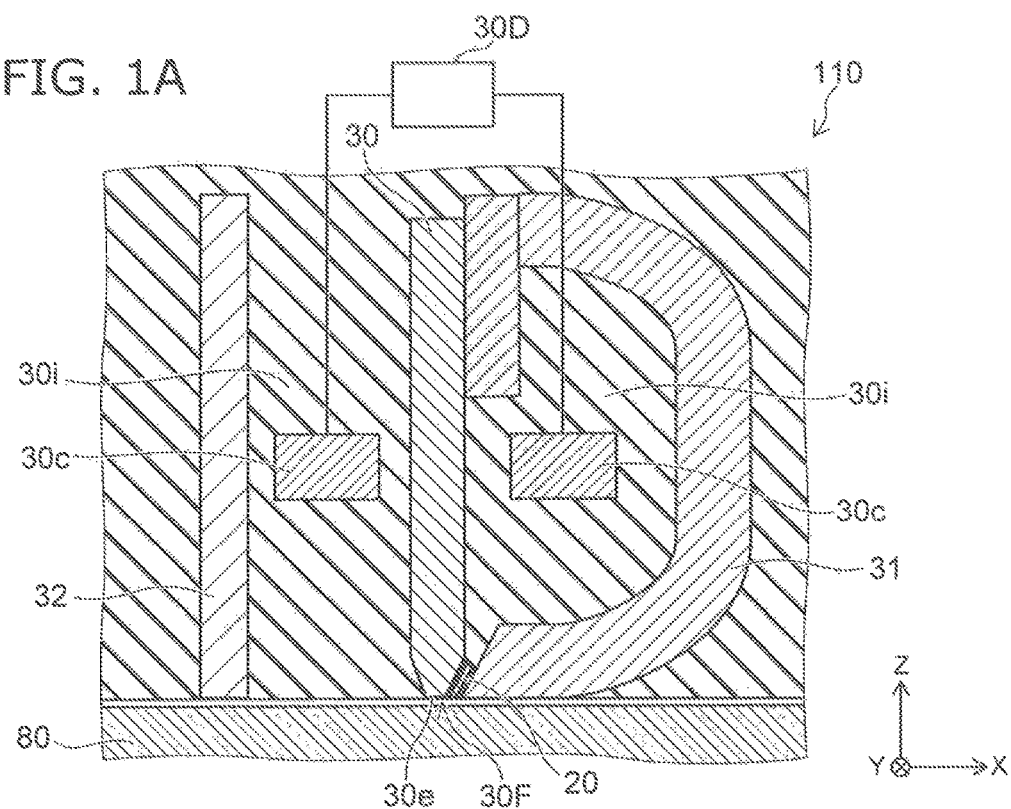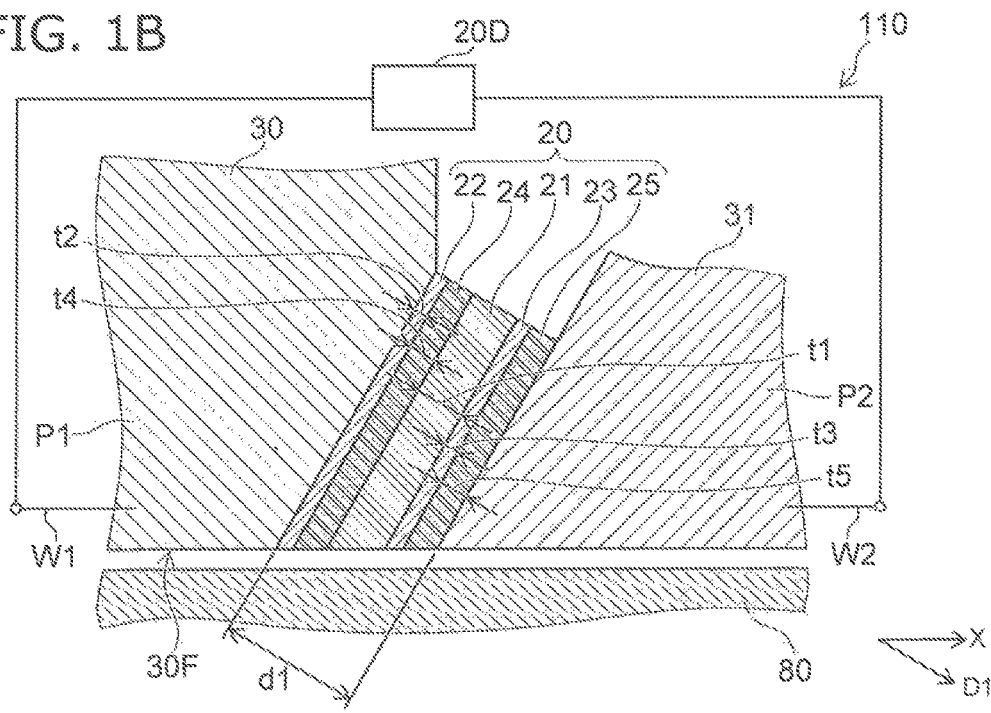

MAGNETIC HEAD AND MAGNETIC RECORDING AND REPRODUCING DEVICE

CROSS-REFERENCE TO RELATED APPLICATIONS

This application is based upon and claims the benefit of priority from Japanese Patent Application No. 2017-043826, filed on Mar. 8, 2017; the entire contents of which are incorporated herein by reference.

FIELD

Embodiments described herein relate generally to a magnetic head and a magnetic recording and reproducing device.

BACKGROUND

Information is recorded in a magnetic storage medium such as a HDD (Hard Disk Drive), etc., using a magnetic head. It is desirable to increase the recording density of the magnetic head and the magnetic recording and reproducing device.

BRIEF DESCRIPTION OF THE DRAWINGS

FIG. 1A and FIG. 1B are schematic cross-sectional views illustrating a magnetic head according to a first embodiment;

DETAILED DESCRIPTION

Figure 2A:
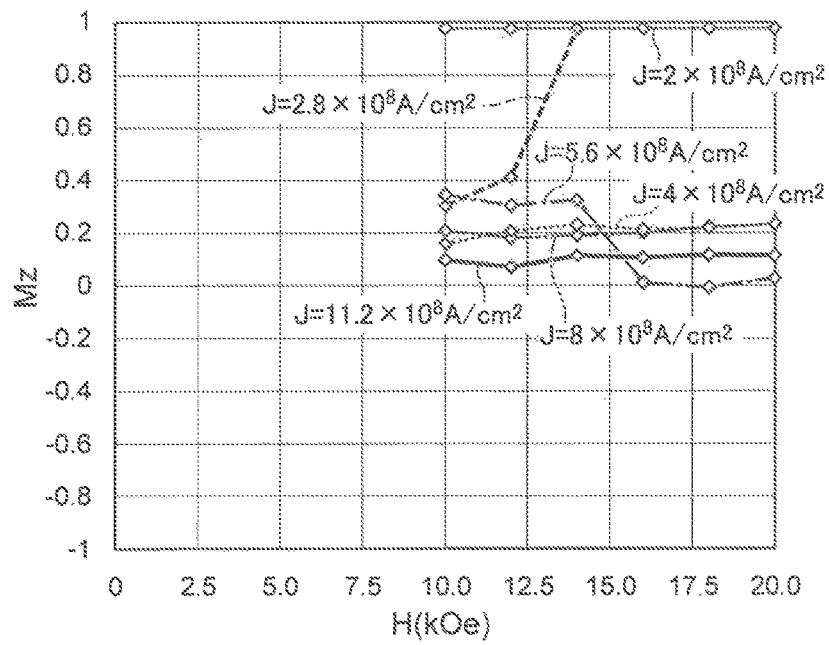
FIG. 2A and FIG. 2B are graphs illustrating characteristics of magnetic heads.

According to one embodiment, a magnetic head includes a magnetic pole, and a first shield, and a stacked body provided between the magnetic pole and the first shield. The stacked body includes a first layer, a second layer and a third layer. The first layer includes at least one first element selected from the group consisting of Fe, Co, and Ni. The second layer is provided between the magnetic pole and the first layer, and includes at least one second element selected from the group consisting of Cr, V, Mn, Ti, and Sc. The third layer is provided between the first layer and the first shield, and includes at least one third element selected from the group consisting of Cr, V, Mn, Ti, and Sc.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1A and FIG. 1B are schematic cross-sectional views illustrating a magnetic head according to a first embodiment.

As shown in FIG. 1A, the magnetic head 110 according to the embodiment includes a magnetic pole 30, a first shield 31, and a stacked body 20. A second shield 32 and a coil 30c are further provided in the example.

The magnetic pole 30 is positioned between the first shield 31 and the second shield 32. At least a portion of the coil 30c is positioned between the magnetic pole 30 and the first shield 31. In the example, a portion of the coil 30c is positioned between the magnetic pole 30 and the second shield 32.

A recording electrical circuit (a second electrical circuit 30D) is electrically connected to the coil 30c, A recording current is supplied to the coil 30c from the recording electrical circuit; and a magnetic field (a recording magnetic field) that corresponds to the recording current from the magnetic pole 30 is generated. The recording magnetic field is applied to a magnetic recording medium 80; and information is recorded in the magnetic recording medium 80. Thus, the recording electrical circuit (the second electrical circuit 30D) is configured to supply, to the coil 30c, a current (a recording current) corresponding to the information to be recorded.

The stacked body 20 is provided between the magnetic pole 30 and the first shield 31.

An insulating portion 30i is provided around the magnetic pole 30, the first shield 31, the second shield 32, the coil 30c, and the stacked body 20.

A medium-opposing surface 30F (air bearing surface, for example) is provided at an end 30e of the magnetic pole 30. The medium-opposing surface 30F is aligned with the ABS of the magnetic head 110. The medium-opposing surface 30F opposes the magnetic recording medium 80.

A direction perpendicular to the medium-opposing surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction, The Y-axis direction is, for example, the cross-track direction.

For example, the magnetic pole 30 is separated from the first shield 31 along the X-axis direction at the vicinity of the medium-opposing surface 30F. For example, the second shield 32 is separated from the magnetic pole 30 along the X-axis direction at the vicinity of the medium-opposing surface 30F. For example, a portion of the magnetic pole 30 is separated from the first shield 31 along the X-axis direction. For example, a portion of the second shield 32 is separated from the magnetic pole 30 along the X-axis direction. The magnetic head 110 and the magnetic recording medium 80 move relatively substantially along the X-axis direction. Thereby, information is recorded at any position of the magnetic recording medium 80.

As shown in FIG. 1B, the stacked body 20 includes a first layer 21, a second layer 22, and a third layer 23. In the example, the stacked body 20 further includes a fourth layer 24 and a fifth layer 25.

The first layer 21 includes at least one first element selected from the group consisting of Fe, Co, and Ni. The first layer 21 is, for example, an FeCo layer, etc. The first layer 21 is a magnetic layer.

The second layer 22 is provided between the magnetic pole 30 and the first layer 21. The second layer 22 includes least one second element selected from the group consisting of Cr, V, Mn, Ti, and Sc. The second layer 22 may further include at least one selected from the group consisting of Fe, Co, and Ni. For example, in the case where the second element is Cr, the second layer 22 is an FeCr layer.

The third layer 23 is provided between the first layer 21 and the first shield 31. The third layer 23 includes at least one third element selected from the group consisting of Cr, V, Mn, Ti, and Sc. The third layer 23 may further include at least one selected from the group consisting of Fe, Co, and Ni. In the case where the third element is Cr, the third layer 23 is an FeCr layer.

The fourth layer 24 includes a metal. The fourth layer 24 includes, for example, at least one selected from the group consisting of Cu, Ag, and Au. The fourth layer 24 is a conductive layer. The fourth layer 24 is provided between the first layer 21 and the second layer 22. The second layer 22 is provided between the magnetic pole 30 and the fourth layer 24.

The fifth layer 25 includes a metal. The fifth layer 25 includes, for example, at least one selected from the group consisting of Cu, Ad, and Au. The fifth layer 25 is a conductive layer. The third layer 23 is provided between the first layer 21 and the fifth layer 25. The fifth layer 25 is provided between the third layer 23 and the first shield 31.

For example, a direction from the second layer 22 toward the third layer 23 is taken as a first direction D1. The first direction D1 corresponds to the stacking direction of the stacked body 20.

In the example, the first direction D1 is tilted with respect to the X-Y plane. In other words, the first direction D1 is tilted with respect to the medium-opposing surface 30F of the magnetic pole 30. The recording magnetic field that is generated at the vicinity of the medium-opposing surface 30F of the magnetic pole 30 can be strengthened; and stable high-density recording is possible.

The magnetic pole 30 includes a first portion P1 overlapping the stacked body 20 in the first direction D1. On the other hand, the first shield 31 includes a second portion P2 overlapping the stacked body 20 in the first direction D1. A distance d1 along the first direction D1 between the first portion P1 and the second portion P2 corresponds to the write gap. In the embodiment, the distance d1 is, for example, not less than 15 nanometers (nm) and not more than 30 nanometers.

As shown in FIG. 1B, for example, a first interconnect W1 and a second interconnect W2 are provided in the magnetic head 110. These interconnects are configured to supply a current to the stacked body 20. For example, the current has an orientation from the third layer 23 toward the second layer 22. When the current is supplied, an electron flows from the second layer 22 toward the third layer 23.

In the example, the first interconnect W1 is electrically connected to the magnetic pole 30. The second interconnect W2 is electrically connected to the first shield 31. The first interconnect W1 may be electrically connected to the second layer 22. The second interconnect W2 is electrically connected to the fifth layer 25. The second interconnect W2 may be electrically connected to the third layer 23. The first interconnect W1 and the second interconnect W2 are electrically connected to a first electrical circuit 20D. The first electrical circuit 20D is configured to supply, to the stacked body 20, the current having the orientation from the third layer 23 toward the second layer 22.

Thus, in the magnetic head 110, interconnects (e.g., the first interconnect W1 and the second interconnect W2) that are configured to supply, to the stacked body 20, the current having the orientation from the third layer 23 toward the second layer 22 can be provided.

By causing the current to flow in such a stacked body 20, it is easy to effectively apply the magnetic field (the recording magnetic field) emitted from the magnetic pole 30 to the magnetic recording medium 80.

For example, in the case where the write gap (the first distance d1) is set to be small to increase the recording density, almost all of the magnetic field emitted from the magnetic pole 30 is oriented directly toward the first shield 31. Therefore, it is difficult for the magnetic field emitted from the magnetic pole 30 to effectively reach the magnetic recording medium 80.

For example, by providing a stacked body 20 such as that recited above between the magnetic pole 30 and the first shield 31 and by causing the current to flow in the stacked body 20, it is considered that the orientation of the magnetization of the first layer 21 of the stacked body 20 becomes the reverse of the orientation of the magnetic field emitted from the magnetic pole 30. Thereby, the direct orientation toward the first shield 31 of the magnetic field emitted from the magnetic pole 30 is suppressed. As a result, much of the magnetic field emitted from the magnetic pole 30 is oriented toward the magnetic recording medium 80. Thereby, even in the case where the write gap is set to be small, an effective recording magnetic field is applied to the magnetic recording medium 80. Thereby, it is possible to increase the recording density.

In the embodiment, a first thickness t1 (the length along the first direction D1 from the second layer 22 toward the third layer 23) of the first layer 21 is, for example, not less than 3 nanometers and not more than 20 nanometers. A second thickness t2 (the length along the first direction D1) of the second layer 22 is not less than 1 nanometer and not more than 10 nanometers. A third thickness t3 (the length along the first direction D1) of the third layer 23 is not less than 1 nanometer and not more than 10 nanometers. A fourth thickness t4 (the length along the first direction D1) of the fourth layer 24 is not less than 0.5 nanometers and not more than 10 nanometers. A fifth thickness t5 (the length along the first direction D1) of the fifth layer 25 is not less than 0.5 nanometers and not more than 10 nanometers. For example, the second thickness t2 is thinner than the first thickness t1. For example, the third thickness t3 is thinner than the first thickness t1.

The sum of the first to fifth thicknesses t1 to t5 corresponds to, for example, the distance d1.

For example, the fourth layer 24 contacts the first layer 21 and the second layer 22. For example, the fifth layer 25 contacts the third layer 23 and the first shield 31. For example, the second layer 22 contacts the magnetic pole 30. For example, the third layer 23 contacts the first layer 21.

Characteristics of the magnetic head according to the embodiment will now be described.

Figure 2B:
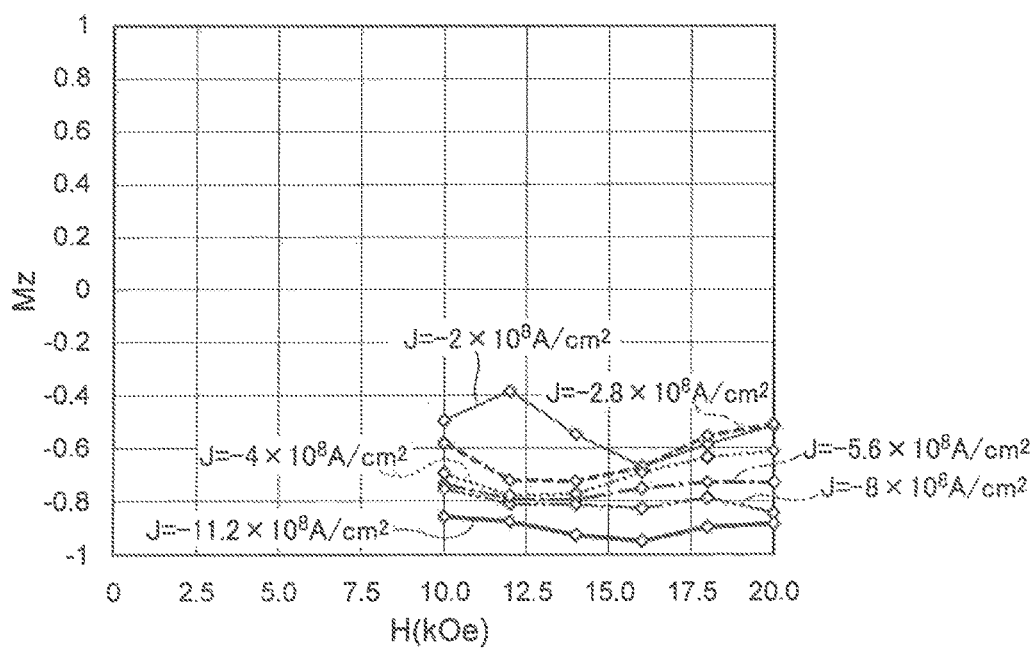

FIG. 2A and FIG. 2B are graphs illustrating characteristics of magnetic heads.

FIG. 2A corresponds to the characteristics of a magnetic head 119 of the reference example. FIG. 2B corresponds to the characteristics of the magnetic head 110 according to the embodiment. These figures show simulation results of the magnetization of the first layer 21 of these magnetic heads.

The configuration of the mod& of the magnetic head 110 is as follows.

The saturation magnetization of the first layer 21 is 1.5 T; the anisotropic magnetic field is 0; and the spin polarization ratio is 0.48. The first thickness t1 is 15 nm.

The saturation magnetization of the second layer 22 is 1.2 T; the anisotropic magnetic field is 0; and the spin polarization ratio is −0.3. The second thickness t2 is 2 nm.

The saturation magnetization of the third layer 23 is 1.2 T; the anisotropic magnetic field is 0; and the spin polarization ratio is −0.3. The third thickness t3 is 2 nm.

The spin diffusion length of the fourth layer 24 is 500 nm. The fourth thickness t4 is 2 nm. The fourth thickness t4 is sufficiently smaller than the spin diffusion length.

The spin diffusion length of the fifth layer 25 is 500 nm. The fifth thickness t5 is 2 nm. The fifth thickness t5 is sufficiently smaller than the spin diffusion length.

The physical property values of the first layer 21 recited above correspond to, for example, an FeCo alloy.

The physical property values of the second layer 22 recited above correspond to, for example, FeCr.

The physical property values of the third layer 23 recited above correspond to, for example, FeCr.

The fourth layer 24 corresponds to, for example, Cu.

The fifth layer 25 corresponds to, for example, Cu.

On the other hand, the second layer 22 and the third layer 23 are not provided in the magnetic head 119. In other words, the first layer 21, the fourth layer 24, and the fifth layer 25 are provided as the stacked body 20. The fourth thickness t4 of the fourth layer 24 is 4 nm; and the fifth thickness t5 of the fifth layer 25 is 4 nm. Otherwise, the configuration of the magnetic head 119 is similar to the magnetic head 110. The write gap (the distance d1) of the magnetic head 119 is the same as the write gap (the distance d1) of the magnetic head 110.

In such a model, the change of the magnetization of the first layer 21 when changing a magnetic field H1 applied to the first layer 21 and a current density J of the current flowing in the stacked body 20 is determined by a simulation based on the LLG equations (Landau-Liftschitz-Gilbert equations).

In FIG. 2A and FIG. 2B, the horizontal axis is the magnetic field H1. The magnetic field H1 is the magnetic field generated in the region between the magnetic pole 30 and the first shield 31 in the case where the stacked body 20 is not provided. The vertical axis is a magnetization Mz. The magnetization of the first layer 21 having one orientation corresponds to the magnetization Mz being 1. The magnetization of the first layer 21 having the reverse orientation corresponds to the magnetization Mz being −1. When the magnetization Mz is positive, the or of the magnetization of the first layer 21 is the same as the orientation of the magnetic field H1 emitted from the magnetic pole 30. When the magnetization Mz is negative, the orientation of the magnetization of the first layer 21 is the reverse of the orientation of the magnetic field H1 emitted from the magnetic pole 30.

As shown in FIG. 2A, the magnetization Mz is positive in the magnetic head 119 of the reference example. In other words, the orientation of the magnetization of the first layer 21 is the same as the orientation of the magnetic field H1 emitted from the magnetic pole 30.

On the other hand, as shown in FIG. 2B, the magnetization Mz is negative in the magnetic head 110 according to the embodiment. In other words, the orientation of the magnetization of the first layer 21 is the reverse of the orientation of the magnetic field H1 emitted from the magnetic pole 30.

Thus, in the magnetic head 110 according to the embodiment, the orientation of the magnetization of the first layer 21 provided between the magnetic pole 30 and the first shield 31 is the reverse of the orientation of the magnetic field H1 emitted from the magnetic pole 30.

Figure 3A:
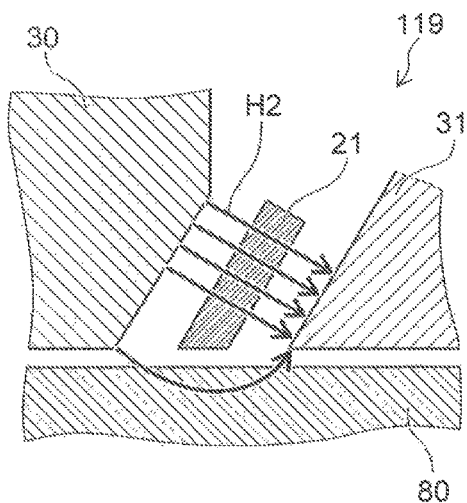
FIG. 3A and FIG. 3B are schematic views illustrating the characteristics of the magnetic heads.
Figure 3B:
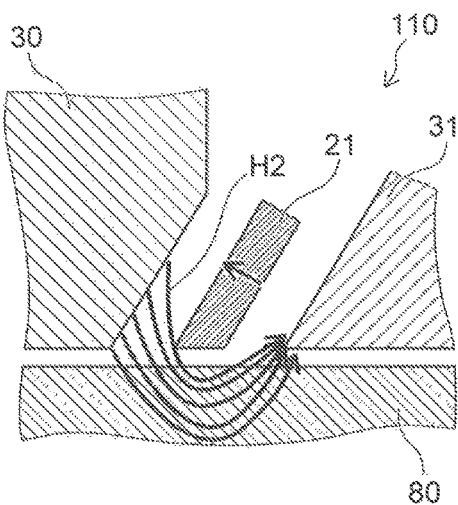

FIG. 3A and FIG. 3B are schematic views illustrating the characteristics of the magnetic heads.

FIG. 3A corresponds to the magnetic head 119 of the reference example. FIG. 3B corresponds to the magnetic head 110 according to the embodiment.

As shown in FIG. 3A, a magnetic field H2 from the magnetic pole 30 toward the first shield 31 is generated. Normally, in the magnetic head 119, the first layer 21 has a positive permeability; therefore, a portion of the magnetic field H2 emitted from the magnetic pole 30 passes through the first layer 21 and enters the first shield 31. Therefore, it is difficult to apply the magnetic field H2 to the magnetic recording medium 80. This phenomenon is pronounced when the write gap is set to be small.

In the magnetic head 110 as shown in FIG. 3B, the orientation of the magnetization of the first layer 21 has a component having the reverse orientation of the orientation of the magnetic field H2. Therefore, the magnetic field H2 that is emitted from the magnetic pole 30 does not pass through the first layer 21 easily. Much of the magnetic field H2 passes through the magnetic recording medium 80 and enters the first shield 31. Therefore, it is easy to apply the magnetic field H2 to the magnetic recording medium 80. Even in the case where the write gap is set to be small, the magnetic field H2 is applied to the magnetic recording medium 80.

Thus, in the embodiment, even in the case where the write gap is set to be small, the magnetic field H2 that is emitted from the magnetic pole 30 and oriented directly toward the first shield 31 with the first layer 21 interposed is suppressed. As a result, much of the magnetic field emitted from the magnetic pole 30 is oriented toward the magnetic recording medium 80; and an effective recording magnetic field is applied to the magnetic recording medium 80. Thereby, it is possible to increase the recording density.

In the embodiment, it is favorable for the absolute value of the current density of the current supplied to the stacked body 20 (the current supplied from the first electrical circuit 20D in the direction from the third layer 23 toward the second layer 22) to be not less than $1 \times 10^8$ A/cm$^2$ and not more than $1 \times 10^{11}$ A/cm$^2$. Thereby, the magnetization of the first layer 21 easily has the reverse orientation of the orientation of the magnetic field H2 emitted from the magnetic pole 30. The current density corresponds to the current per unit surface area flowing in the stacked body 20 in a plane orthogonal to the first direction D1.

Figure 4A:
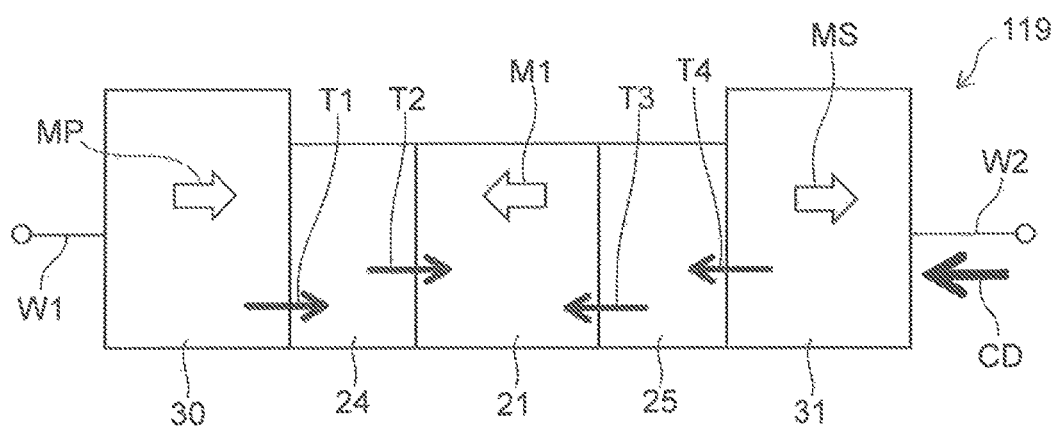
FIG. 4A and FIG. 4B are schematic views illustrating operations of the magnetic heads.
Figure 4B:
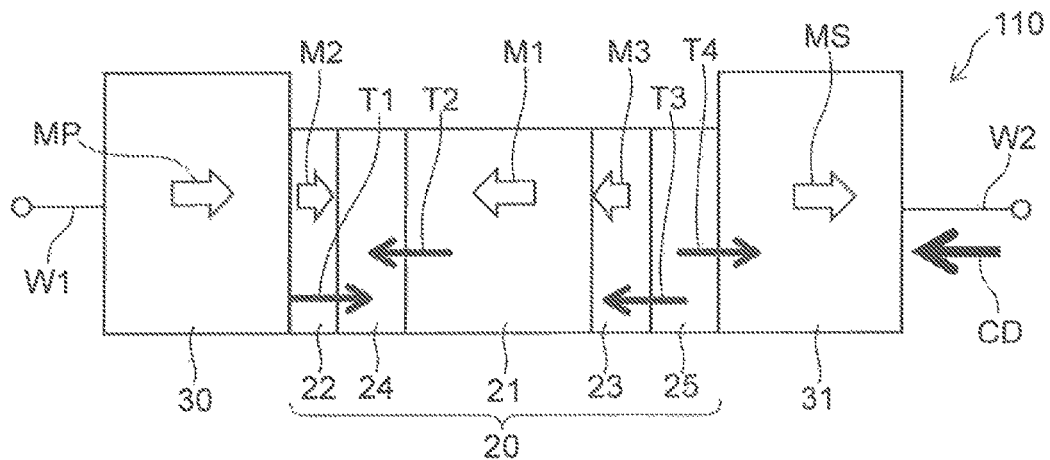

FIG. 4A and FIG. 4B are schematic views illustrating operations of the magnetic heads.

FIG. 4A corresponds to the magnetic head 119 of the reference example. FIG. 4B corresponds to the magnetic head 110 according to the embodiment. These figures schematically illustrate the orientation of the spin torque and the magnetization direction when the first layer 21 is in the reverse state.

As shown in FIG. 4B, the magnetic head 110 is as follows.

A spin torque T1 acts on the magnetically coupled magnetic pole 30 and second layer 22 at one of the two interfaces having the fourth layer 24 interposed.

A spin torque T2 acts on the magnetically coupled first layer 21 and third layer 23 at the other of the two interfaces having the fourth layer 24 interposed.

A spin torque T3 acts on the magnetically coupled first layer 21 and third layer 23 at one of the two interfaces having the fifth layer 25 interposed.

A spin torque T5 acts on the first shield 31 at the other of the two interfaces having the fifth layer 25 interposed.

The first layer 21 has the orientation of a magnetization M1. The second layer 22 has the orientation of a magnetization M2. The third layer 23 has the orientation of a magnetization M1. The magnetic pole 30 has the orientation of a magnetization MP. The first shield 31 has the orientation of a magnetization MS.

In the magnetic head 119 as shown in FIG. 4A, the spin torque T2 and the spin torque T3 that act from the two interfaces having the first layer 21 interposed have mutually-reverse orientations in the reverse magnetization state of the first layer 21. Therefore, it is difficult to stably maintain the reverse magnetization state of the first layer 21.

On the other hand, in the magnetic head 110, the orientations of the spin torque T2 and the spin torque T3 acting from the two interfaces having the first layer 21 interposed are the same as the orientation of the magnetization M1. In the first layer 21, the reverse magnetization state can be maintained stably.

Thus, the second layer 22 and the third layer 23 that include materials having negative spin polarization ratios are provided in the stacked body 20 of the magnetic head 110 according to the embodiment. Thereby, the directions of the spin torque acting on the magnetic pole 30, the first shield 31, and the first layer 21 are controlled. Thereby, a stable reverse state can be obtained.

In the embodiment, the concentration of the second element (at least one selected from the group consisting of Cr, V, Mn, Ti, and Sc) of the second layer 22 is not less than 1 atomic percent and not more than 80 atomic percent. The concentration of the third element (at least one selected from the group consisting of Cr, V, Mn, Ti, and Sc) of the third layer 23 is not less than 1 atomic percent and not more than 80 atomic percent. A negative spin polarization ratio is obtained stably in the second layer 22 and the third layer 23 by such concentrations.

The magnetic pole 30 includes at least one selected from the group consisting of Fe, Co, and Ni. The first shield 31 includes at least one selected from the group consisting of Fe, Co, and Ni.

Figure 5:
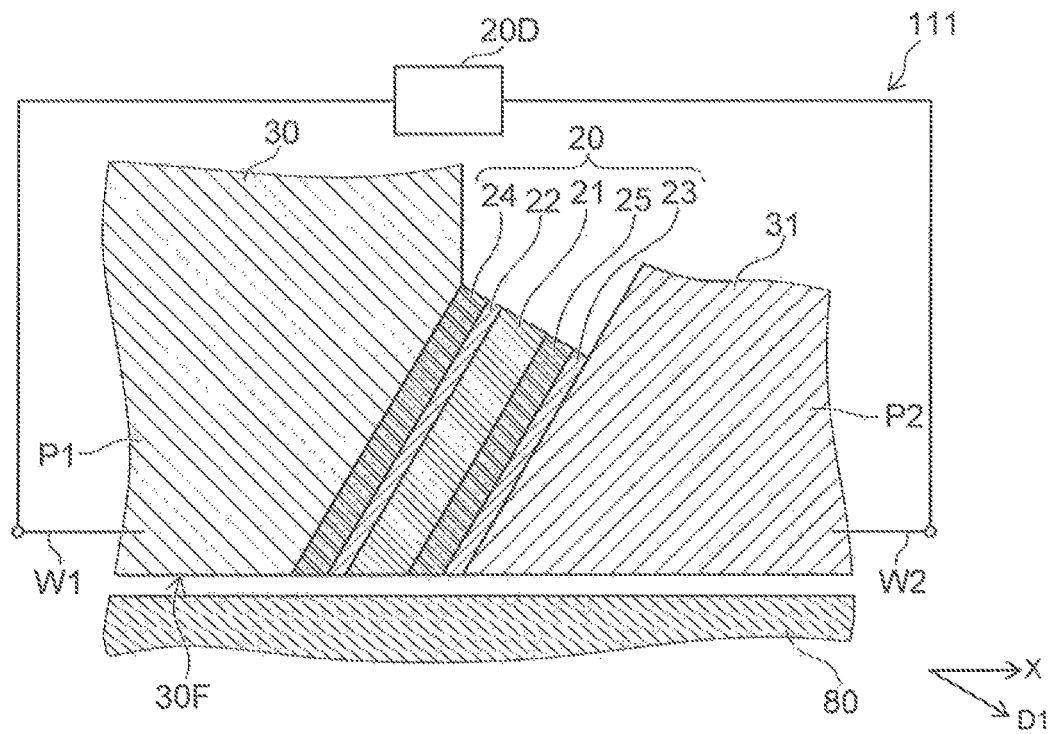
FIG. 5 is a schematic cross-sectional view illustrating another magnetic head according to the first embodiment.

FIG. 5 is a schematic cross-sectional view illustrating another magnetic head according to the first embodiment.

As shown in FIG. 5, the other magnetic head 111 according to the embodiment also includes the magnetic pole 30, the first shield 31 and the stacked body 20. The second shield 32 and the coil 30c (referring to FIG. 1A) may be provided in the example. The stacked body 20 includes the first to fifth layers 21 to 25. The order of the first to fifth layers 21 to 25 in the example is different from the order in the magnetic head 110. Otherwise, the configuration of the magnetic head 111 is similar to the configuration of the magnetic head 110. The stacked body 20 of the magnetic head 111 will now be described.

As shown in FIG. 5, the second layer 22 is provided between the first layer 21 and the fourth layer 24. The fifth layer 25 is provided between the first layer 21 and the third layer 23. For example, the second layer 22 contacts the fourth layer 24 and the first layer 21. For example, the fifth layer 25 contacts the first layer 21 and the third layer 23. For example, the fourth layer 24 contacts the magnetic pole 30. For example, the third layer 23 contacts the first shield 31.

The interconnects (the first interconnect W1 and the second interconnect W2) are provided in such a case as well. The interconnects are configured to supply, to the stacked body 20, a current having an orientation from the second layer 22 toward the third layer 23.

In such a magnetic head 111 as well, even in the case where the write gap is set to be small, an effective recording magnetic field is applied to the magnetic recording medium 80. Thereby, it is possible to increase the recording density.

Second Embodiment

A second embodiment relates to a magnetic memory device. The magnetic memory device according to the embodiment includes the magnetic head 110, the magnetic recording medium 80 (e.g., a recording medium disk 180 described below), and the first electrical circuit 20D (referring to FIG. 1B). Information is recorded in the magnetic recording medium by the magnetic head 110 (the magnetic pole 30).

As described above, the first electrical circuit 20D is configured to supply, to the stacked body 20, a current having an orientation from the second layer 22 toward the third layer 23 of the magnetic head 110. As described above, the absolute value of the density of the current in the direction from the second layer 22 toward the third layer 23 is, for example, not less than $1 \times 10^8$ A/cm$^2$ and not more than $1 \times 10^{11}$ A/cm$^2$. Such a current is supplied to the stacked body 20 from the first electrical circuit 20D.

The magnetic memory device according to the embodiment may further include the second electrical circuit 30D (referring to FIG. 1A). As described above, the second electrical circuit 30D is configured to supply, to the coil 30c, a current (a recording current) corresponding to the information to be recorded in the magnetic recording medium 80.

An example of a magnetic recording and reproducing device according to the embodiment will now be described.

Figure 6:
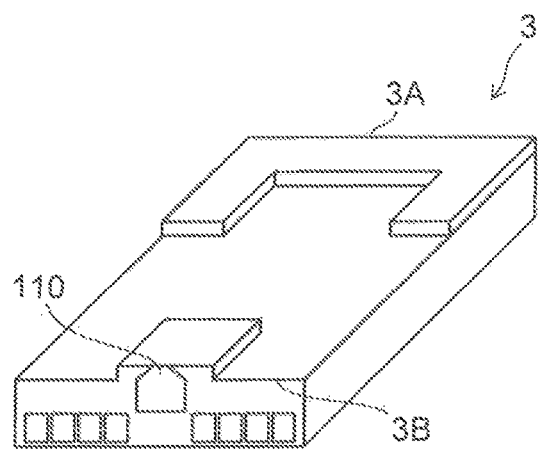
FIG. 6 is a schematic perspective view illustrating a portion of the magnetic recording and reproducing device according to the second embodiment.

FIG. 6 is a schematic perspective view illustrating a portion of the magnetic recording and reproducing device according to the second embodiment. FIG. 6 illustrates a head slider.

The magnetic head 110 is provided in a head slider 3. The head slider 3 includes, for example, Al$_2$O$_3$/TiC, etc. The head slider 3 moves relative to the magnetic recording medium while flying over or contacting the magnetic recording medium.

The head slider 3 has, for example, an air inflow side 3A and an air outflow side 3B. The magnetic head 110 is disposed at the side surface of the air outflow side 3B of the head slider 3 or the like. Thereby, the magnetic head 110 moves relative to the magnetic recording medium while flying over or contacting the magnetic recording medium.

Figure 7:
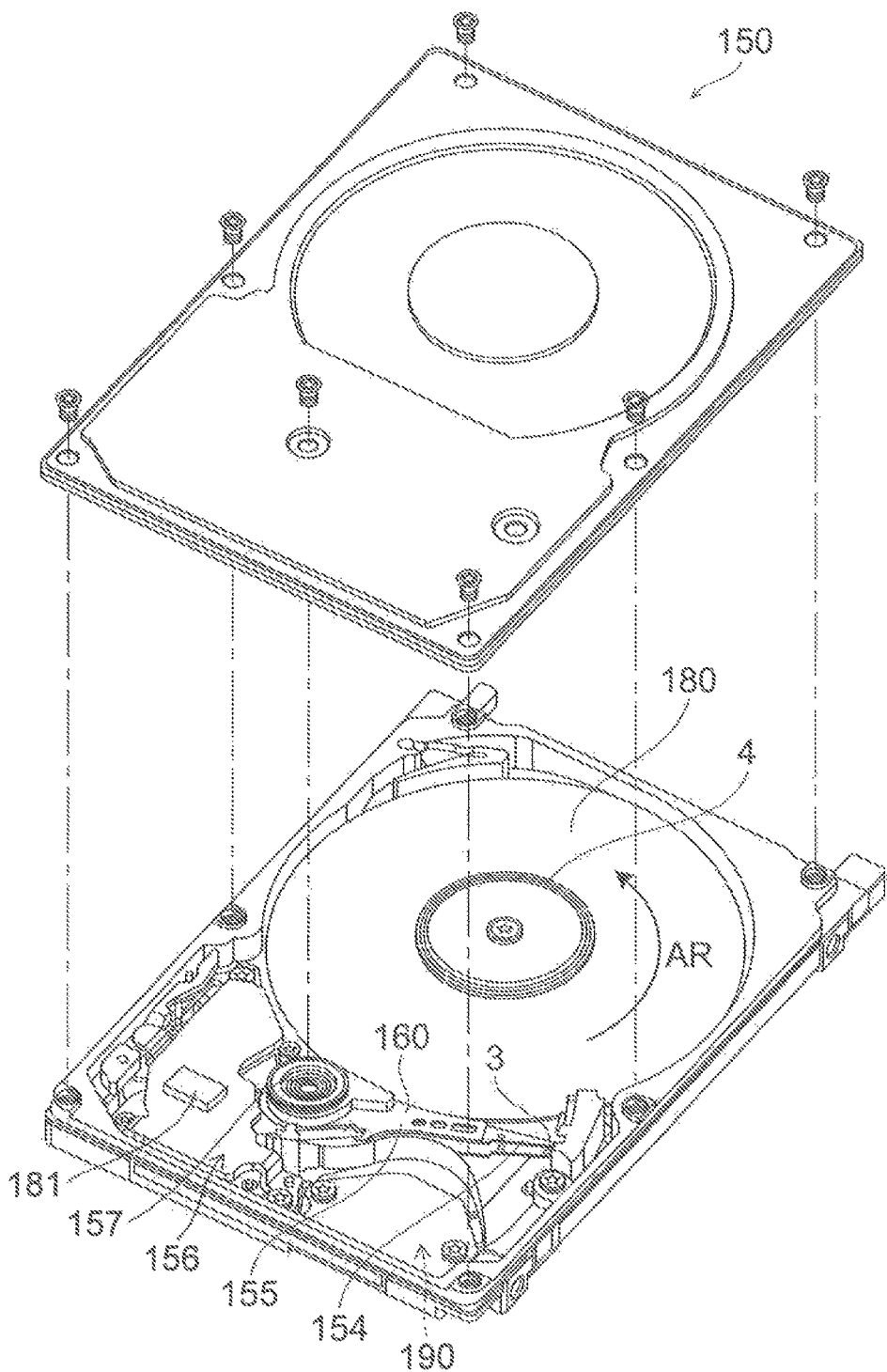
FIG. 7 is a schematic perspective view illustrating the magnetic recording and reproducing device according to the second embodiment.

FIG. 7 is a schematic perspective view illustrating the magnetic recording and reproducing device according to the second embodiment.

Figure 8A:
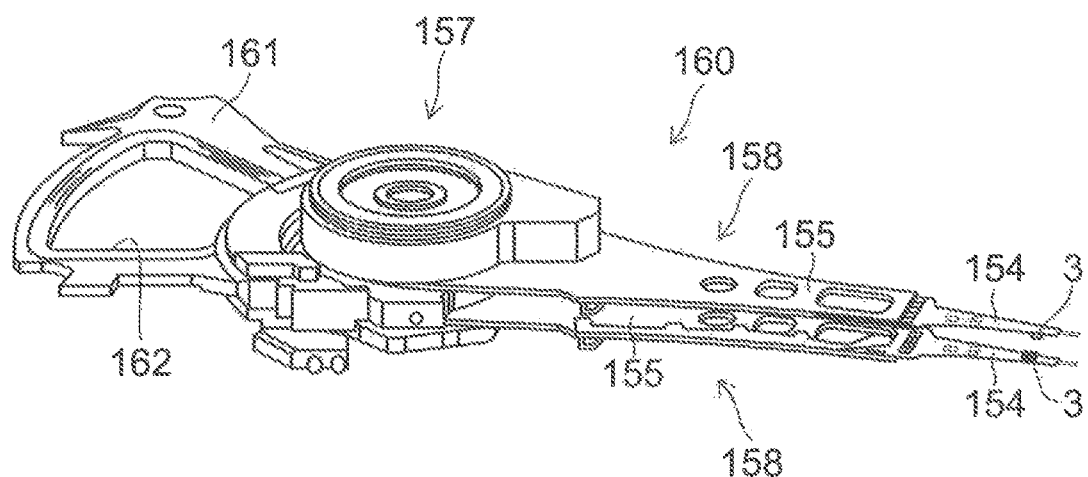
FIG. 8A and FIG. 8B are schematic perspective views illustrating portions of the magnetic recording and reproducing device according to the second embodiment.
Figure 8B:
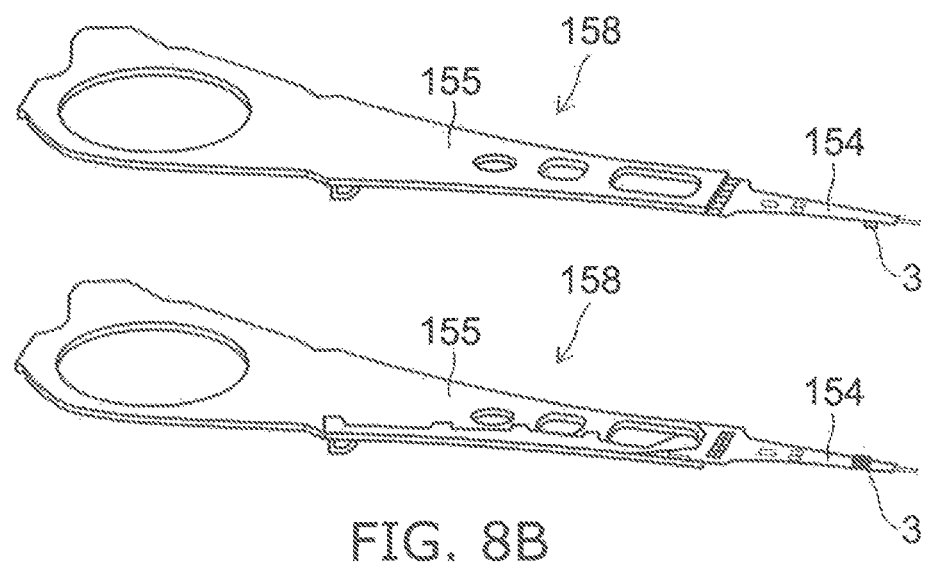

FIG. 8A and FIG. 8B are schematic perspective views illustrating portions of the magnetic recording and reproducing device according to the second embodiment.

As shown in FIG. 7, a rotary actuator is used in the magnetic recording and reproducing device 150 according to the embodiment. The recording medium disk 180 is mounted to a spindle motor 4. The recording medium disk 180 is rotated in the direction of arrow AR by a motor. The motor responds to a control signal from a drive device controller. The magnetic recording and reproducing device 150 according to the embodiment may include multiple recording medium disks 180. The magnetic recording and reproducing device 150 may include a recording medium 181. The recording medium 181 for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 3 performs the recording and the reproducing of the information recorded in the recording medium disk 180. The head slider 3 is provided at the tip of a suspension 154 having a thin-film configuration. Any of the magnetic heads according to the embodiments is provided at the tip vicinity of the head Aider 3.

When the recording medium disk 180 rotates, the downward pressure due to the suspension 154 and the pressure generated at the medium-opposing surface (the ABS) of the head slider 3 are balanced. The distance between the medium-opposing surface of the head slider 3 and the surface of the recording medium disk 180 is a prescribed fly height. In the embodiment, the head slider 3 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can be caused to rotate and slide by the voice coil motor 156. The magnetic head is movable to any position of the recording medium disk 180.

FIG. 8A illustrates the configuration of a portion of the magnetic recording and reproducing device and is an enlarged perspective view of a head stack assembly 160.

FIG. 8B is a perspective view illustrating a magnetic head assembly (head gimbal assembly (HGA)) 158 which is a portion of the head stack assembly 160.

As shown in FIG. 8A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor. As shown in FIG. 8B, the head gimbal assembly 158 includes the arm 155 that extends from the bearing part 157, and the suspension 154 that extends from the arm 155.

The head slider 3 is provided at the tip of the suspension 154. Any of the magnetic heads according to the embodiment is provided in the head slider 3.

The magnetic head assembly (the head gimbal assembly) 158 according to the embodiment includes the magnetic head according to the embodiment, the head slider 3 in which the magnetic head is provided, the suspension 154, and the arm 155. The head slider 3 is provided at the one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater for fly height adjustment. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 performs recording and reproducing of the signals to and from the magnetic recording medium by using the magnetic head. The signal processor 190 is electrically connected to the magnetic head by the input/output lines of the signal processor 190 being connected to, for example, electrode pads of the head gimbal assembly 158.

The magnetic recording and reproducing device 150 according to the embodiment includes a magnetic recording medium, the magnetic head according to the embodiment, a movable part, a position controller, and a signal processor. The movable part is relatively movable in a state in which the magnetic recording medium and the magnetic head are separated from each other or in contact with each other. The position controller aligns the magnetic head at a prescribed recording position of the magnetic recording medium. The signal processor performs recording and reproducing of the signals to and from the magnetic recording medium by using the magnetic head.

For example, the recording medium disk 180 is used as the magnetic recording medium recited above. The movable part recited above includes, for example, the head slider 3. The position controller recited above includes, for example, the head gimbal assembly 158.

The magnetic recording and reproducing device 150 according to the embodiment includes the magnetic recording medium, the magnetic head assembly according to the embodiment, and the signal processor that performs recording and reproducing of the signals to and from the magnetic recording medium by using the magnetic head provided in the magnetic head assembly.

The embodiments may include the following configurations (e.g., "technological proposals").
Configuration 1
  A magnetic head, comprising:
    a magnetic pole;
    a first shield; and
    a stacked body provided between the magnetic pole and the first shield,
    the stacked body including
    a first layer including at least one first element selected from the group consisting of Fe, Co, and Ni,
    a second layer provided between the magnetic pole and the first layer, the second layer including at least one second element selected from the group consisting of Cr, V, Mn, Ti, and Sc, and,
    a third layer provided between the first layer and the first shield, the third layer including at least one third element selected from the group consisting of Cr, V, Mn, Ti, and Sc.

Configuration 2

The magnetic head according to Configuration 1, wherein the stacked body further includes a fourth layer including a metal, and a fifth layer including a metal, the fourth layer is provided between the first layer and the second layer, and the third layer is provided between the first layer and the fifth layer.

Configuration 3

The magnetic head according to Configuration 2, wherein the fourth layer contacts the first layer and the second layer, and the fifth layer contacts the third layer and the first shield.

Configuration 4

The magnetic head according to Configuration 2 or 3, wherein the second layer contacts the magnetic pole, and the third layer contacts the first layer.

Configuration 5

The magnetic head according to any one of Configurations 2 to 4, further comprising an interconnect configured to supply, to the stacked body, a current having an orientation from the third layer toward the second layer.

Configuration 6

The magnetic head according to Configuration 1, wherein the stacked body further includes a fourth layer including a metal, and a fifth layer including a metal;

the second layer is provided between the first layer and the fourth layer, and the fifth layer is provided between the first layer and the third layer.

Configuration 7

The magnetic head according to Configuration 6, wherein the second layer contacts the fourth layer and the first layer, and the fifth layer contacts the first layer and the third layer.

Configuration 8

The magnetic head according to Configuration 6 or 7, wherein the fourth layer contacts the magnetic pole, and the third layer contacts the first shield.

Configuration 9

The magnetic head according to any one of Configurations 6 to 8, further comprising an interconnect configured to supply, to the stacked body, a current having an orientation from the second layer toward the third layer.

Configuration 10

The magnetic head according to any one of Configurations 2 to 9, wherein the fourth layer includes at least one selected from the group consisting of Cu, Ag, and Au, and the fifth layer includes at least one selected from the group consisting of Cu, Ag, and Au.

Configuration 11

The magnetic head according to any one of Configurations 2 to 10, wherein a fourth thickness of the fourth layer along a direction from the second layer toward the third layer is not less than 0.5 nanometers and not more than 10 nanometers, and a fifth thickness of the fifth layer along the direction from the second layer toward the third layer is not less than 0.5 nanometers and not more than 10 nanometers.

Configuration 12

The magnetic head according to any one of Configurations 1 to 11, wherein the second layer further includes at least one selected from the group consisting of Fe, Co, and Ni, and the third layer further includes at least one selected from the group consisting of Fe, Co, and Ni.

Configuration 13

The magnetic head according to any one of Configurations 1 to 12, wherein a concentration of the second element of the second layer is not less than 1 atomic percent and not more than 80 atomic percent, and a concentration of the third element of the third layer is not less than 1 atomic percent and not more than 80 atomic percent.

Configuration 14

The magnetic head according to any one of Configurations 1 to 13, wherein a first thickness of the first layer along a first direction from the second layer toward the third layer is not less than 3 nanometers and not more than 20 nanometers.

Configuration 15

The magnetic head according to Configuration 14, wherein a second thickness of the second layer along the first direction is thinner than the first thickness, and a third thickness of the third layer along the first direction is thinner than the first thickness.

Configuration 16

The magnetic head according to Configuration 14, wherein a second thickness of the second layer along the first direction is not less than 1 nanometer and not more than 10 nanometers, and a third thickness of the third layer along the first direction is not less than 1 nanometer and not more than 10 nanometers.

Configuration 17

The magnetic head according to any one of Configurations 14 to 16, wherein the magnetic pole includes a first portion overlapping the stacked body in the first direction, the first shield includes a second portion overlapping the stacked body in the first direction, and a distance along the first direction between the first portion and the second portion is not less than 15 nanometers and not more than 30 nanometers.

Configuration 18

The magnetic head according to any one of Configurations 1 to 17, wherein the magnetic pole has a medium-opposing surface, and the first direction is tilted with respect to the medium-opposing surface.

Configuration 19

The magnetic head according to any one of Configurations 1 to 18, further comprising a second shield, the magnetic pole being positioned between the first shield and the second shield.

Configuration 20

The magnetic head according to any one of Configurations 1 to 19, wherein the magnetic pole includes at least one selected from the group consisting of Fe, Co, and Ni.

Configuration 21

The magnetic head according to any one of Configurations 1 to 20, wherein a magnetization of the first layer has a component having a reverse orientation of a magnetic field emitted from the magnetic pole.

Configuration 22

A magnetic recording and reproducing device, comprising:

the magnetic head according to any one of Configurations 2 to 5;

a magnetic recording medium where information is recorded by the magnetic head; and a first electrical circuit configured to supply, to the stacked body, a current having an orientation from the third layer toward the second layer.

Configuration 23

A magnetic recording and reproducing device, comprising:

the magnetic head according to any one of Configurations 6 to 9;

a magnetic recording medium where information is recorded by the magnetic head; and a first electrical circuit configured to supply, to the stacked body, a current having an orientation from the second layer toward the third layer.

Configuration 24

The magnetic recording and reproducing device according to Configuration 22 or 23, further comprising a second electrical circuit, the magnetic head further including a coil, at least a portion of the coil being positioned between the magnetic pole and the first shield, the second electrical circuit being configured to supply, to the coil, a current corresponding to the information.

Configuration 25

The magnetic recording and reproducing device according to any one of Configurations 22 to 24, wherein the absolute value of a density of the current is not less than $1 \times 10^8$ A/cm$^2$ and not more than $1 \times 10^{11}$ A/cm$^2$.

According to the embodiments, a magnetic head and a magnetic recording and reproducing device can be provided in which it is possible to increase the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, stacked bodies, interconnects, etc, from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover all magnetic heads, and magnetic recording and reproducing devices practicable by an appropriate design modification by one skilled in the art based on the magnetic heads, and the magnetic producing and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:

a magnetic pole;

a first shield; and a stacked body provided between the magnetic pole and the first shield, the stacked body including a first layer including at least one first element selected from the group consisting of Fe, Co, and Ni, a second layer provided between the magnetic pole and the first layer, the second layer including at least one second element selected from the group consisting of Cr, V, Mn, Ti, and Sc, and a third layer provided between the first layer and the first shield, the third layer including at least one third element selected from the group consisting of Cr, V, Mn, Ti, and Sc, wherein the stacked body further includes a fourth layer including a metal, and a fifth layer including a metal, the fourth layer is provided between the first layer and the second layer, the third layer is provided between the first layer and the fifth layer, the second layer contacts the magnetic pole, and the third layer contacts the first layer.

2. The head according to claim 1, wherein the fourth layer contacts the first layer and the second layer, and the fifth layer contacts the third layer and the first shield.

3. The head according to claim 1, further comprising an interconnect configured to supply a current to the stacked body, the current having an orientation from the third layer toward the second layer.

4. The head according to claim 1, wherein the fourth layer includes at least one selected from the group consisting of Cu, Ag, and Au, and the fifth layer includes at least one selected from the group consisting of Cu, Ag, and Au.

5. The head according to claim 1, wherein a fourth thickness of the fourth layer along a direction from the second layer toward the third layer is not less than 0.5 nanometers and not more than 10 nanometers, and a fifth thickness of the fifth layer along the direction from the second layer toward the third layer is not less than 0.5 nanometers and not more than 10 nanometers.

6. A magnetic recording and reproducing device, comprising:

the magnetic head according to claim 1;

a magnetic recording medium where information is recorded by the magnetic head; and a first electrical circuit configured to supply a current to the stacked body, the current having an orientation from the third layer toward the second layer.

7. The device according to claim 6, further comprising a second electrical circuit,
the magnetic head further including a coil,
at least a portion of the coil being positioned between the magnetic pole and the first shield,
the second electrical circuit being configured to supply a current to the coil, the current corresponding to the information.

8. A magnetic head, comprising:
a magnetic pole;
a first shield; and
a stacked body provided between the magnetic pole and the first shield,
the stacked body including
a first layer including at least one first element selected from the group consisting of Fe, Co, and Ni,
a second layer provided between the magnetic pole and the first layer, the second layer including at least one second element selected from the group consisting of Cr, V, Mn, Ti, and Sc, and
a third layer provided between the first layer and the first shield, the third layer including at least one third element selected from the group consisting of Cr, V, Mn, Ti, and Sc,
wherein
the stacked body further includes a fourth layer including a metal, and a fifth layer including a metal,
the second layer is provided between the first layer and the fourth layer, and
the fifth layer is provided between the first layer and the third layer.

9. The head according to claim 8, wherein
the second layer contacts the fourth layer and the first layer, and
the fifth layer contacts the first layer and the third layer.

10. The head according to claim 8, wherein
the fourth layer contacts the magnetic pole, and
the third layer contacts the first shield.

11. The head according to claim 8, further comprising an interconnect configured to supply a current to the stacked body, the current having an orientation from the second layer toward the third layer.

12. A magnetic recording and reproducing device, comprising:
the magnetic head according to claim 8;
a magnetic recording medium where information is recorded by the magnetic head; and
a first electrical circuit configured to supply a current to the stacked body, the current having an orientation from the second layer toward the third layer.

13. The device according to claim 12, further comprising a second electrical circuit,
the magnetic head further including a coil,
at least a portion of the coil being positioned between the magnetic pole and the first shield,
the second electrical circuit being configured to supply a current to the coil, the current corresponding to the information.

14. A magnetic head, comprising:
a magnetic pole;
a first shield; and
a stacked body provided between the magnetic pole and the first shield,
the stacked body including
a first layer including at least one first element selected from the group consisting of Fe, Co, and Ni,
a second layer provided between the magnetic pole and the first layer, the second layer including at least one second element selected from the group consisting of Cr, V, Mn, Ti, and Sc, and
a third layer provided between the first layer and the first shield, the third layer including at least one third element selected from the group consisting of Cr, V, Mn, Ti, and Sc,
wherein
the second layer further includes at least one selected from the group consisting of Fe, Co, and Ni, and
the third layer further includes at least one selected from the group consisting of Fe, Co, and Ni.

15. A magnetic recording and reproducing device, comprising:
the magnetic head according to claim 14;
a magnetic recording medium where information is recorded by the magnetic head; and
a first electrical circuit configured to supply a current to the stacked body, the current having an orientation from the second layer toward the third layer.

16. The device according to claim 15, further comprising a second electrical circuit,
the magnetic head further including a coil,
at least a portion of the coil being positioned between the magnetic pole and the first shield,
the second electrical circuit being configured to supply a current to the coil, the current corresponding to the information.

17. A magnetic head, comprising:
a magnetic pole;
a first shield; and
a stacked body provided between the magnetic pole and the first shield,
the stacked body including
a first layer including at least one first element selected from the group consisting of Fe, Co, and Ni,
a second layer provided between the magnetic pole and the first layer, the second layer including at least one second element selected from the group consisting of Cr, V, Mn, Ti, and Sc, and
a third layer provided between the first layer and the first shield, the third layer including at least one third element selected from the group consisting of Cr, V, Mn, Ti, and Sc,
wherein
a concentration of the second element in the second layer is not less than 1 atomic percent and not more than 80 atomic percent, and
a concentration of the third element in the third layer is not less than 1 atomic percent and not more than 80 atomic percent.

18. A magnetic head, comprising:
a magnetic pole;
a first shield; and
a stacked body provided between the magnetic pole and the first shield,
the stacked body including
a first layer including at least one first element selected from the group consisting of Fe, Co, and Ni,
a second layer provided between the magnetic pole and the first layer, the second layer including at least one second element selected from the group consisting of Cr, V, Mn, Ti, and Sc, and a third layer provided between the first layer and the first shield, the third layer including at least one third element selected from the group consisting of Cr, V, Mn, Ti, and Sc,
wherein
a first thickness of the first layer along a first direction from the second layer toward the third layer is not less than 3 nanometers and not more than 20 nanometers,
a second thickness of the second layer along the first direction is thinner than the first thickness, and
a third thickness of the third layer along the first direction is thinner than the first thickness.

19. A magnetic head, comprising:
a magnetic pole;
a first shield; and
a stacked body provided between the magnetic pole and the first shield,
the stacked body including
a first layer including at least one first element selected from the group consisting of Fe, Co, and Ni,
a second layer provided between the magnetic pole and the first layer, the second layer including at least one second element selected from the group consisting of Cr, V, Mn, Ti, and Sc, and
a third layer provided between the first layer and the first shield, the third layer including at least one third element selected from the group consisting of Cr, V, Mn, Ti, and Sc,
wherein a magnetization of the first layer has a component having a reverse orientation of a magnetic field emitted from the magnetic pole.

* * * * *